(12) United States Patent
Ahn

(10) Patent No.: US 10,644,883 B2
(45) Date of Patent: *May 5, 2020

(54) MOBILE COMMERCE AND AUTHENTICATION METHOD HAVING IMPROVED SECURITY BASED ON QUANTUM CRYPTOGRAPHY

(71) Applicant: University of Seoul Industry Cooperation Foundation, Seoul (KR)

(72) Inventor: Do Yeol Ahn, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 105 days.

This patent is subject to a terminal disclaimer.

(21) Appl. No.: 15/655,323

(22) Filed: Jul. 20, 2017

(65) Prior Publication Data

US 2017/0324551 A1 Nov. 9, 2017

Related U.S. Application Data

(63) Continuation of application No. PCT/KR2016/000767, filed on Jan. 25, 2016.

(30) Foreign Application Priority Data

Jan. 23, 2015 (KR) .................. 10-2015-0011411

(51) Int. Cl.
*H04L 9/08* (2006.01)
*G06Q 20/12* (2012.01)
(Continued)

(52) U.S. Cl.
CPC ........... *H04L 9/0852* (2013.01); *G06Q 20/12* (2013.01); *G06Q 20/30* (2013.01);
(Continued)

(58) Field of Classification Search
CPC combination set(s) only.
See application file for complete search history.

(56) References Cited

U.S. PATENT DOCUMENTS

5,204,970 A * 4/1993 Stengel ............... H04W 52/146
455/126
5,764,765 A * 6/1998 Phoenix ............... H04L 9/0858
380/256
(Continued)

FOREIGN PATENT DOCUMENTS

JP 2005-217676 A 8/2005
JP 2006-203559 A 8/2006
(Continued)

OTHER PUBLICATIONS

Marcos Curty and Norbert Latkenhaus, Intercept-resend attacks in the Bennett-Brassard 1984 quantum-key-distribution protocol with weak coherent pulses, Jun. 1, 2005, Physical Review A, vol. 71, Issue 6 (Year: 2005).*

(Continued)

*Primary Examiner* — Farid Homayounmehr
*Assistant Examiner* — Zhimei Zhu
(74) *Attorney, Agent, or Firm* — Nelson, Mullins, Riley & Scarborough LLP; Kongsik Kim, Esq.

(57) ABSTRACT

Disclosed herein are technologies regarding a communication device and server which are capable of cryptographic communication based on quantum cryptography. A communication device for quantum cryptography authentication includes: an optical communication unit configured to receive a series of first quantum signals generated by passing through a first quantum filter of the communication device; a quantum signal generation unit configured to generate the first quantum signals by setting up the first quantum filter in a reception path for a series of second quantum signals generated and sent by a server; and a processor configured (Continued)

to select the setup of the first quantum filter based on a series of randomly generated first quantum states, and to control the quantum signal generation unit to generate the first quantum signals by using the first quantum filter.

6 Claims, 12 Drawing Sheets

(51) Int. Cl.
    *G06Q 20/38*        (2012.01)
    *H04L 29/06*        (2006.01)
    *G06Q 20/30*        (2012.01)
    *H04L 9/06*         (2006.01)
    *H04L 9/14*         (2006.01)
    *H04L 9/32*         (2006.01)
    *G06Q 20/40*        (2012.01)

(52) U.S. Cl.
    CPC ....... *G06Q 20/3823* (2013.01); *H04L 9/0662* (2013.01); *H04L 9/0855* (2013.01); *H04L 9/0872* (2013.01); *H04L 9/14* (2013.01); *H04L 9/3226* (2013.01); *H04L 63/08* (2013.01); *G06Q 20/401* (2013.01); *G06Q 2220/00* (2013.01); *H04L 2209/80* (2013.01); *H04L 2463/102* (2013.01)

(56) References Cited

U.S. PATENT DOCUMENTS

| | | | |
|---|---|---|---|
| 7,734,049 B2 | 6/2010 | Niemi et al. | |
| 7,899,183 B2 | 3/2011 | Tajima et al. | |
| 8,139,944 B2* | 3/2012 | Capron | H04B 10/112 398/118 |
| 8,600,051 B2 | 12/2013 | Noh | |
| 8,781,129 B2 | 7/2014 | Bush et al. | |
| 8,855,316 B2 | 10/2014 | Wiseman et al. | |
| 9,246,602 B2* | 1/2016 | Ukita | H04L 9/0858 |
| 2004/0120527 A1 | 6/2004 | Hawkes et al. | |
| 2005/0286723 A1* | 12/2005 | Vig | H04L 9/0855 380/278 |
| 2006/0129811 A1* | 6/2006 | Fiske | H04L 9/0631 713/167 |
| 2007/0071245 A1* | 3/2007 | Kuang | H04L 9/0855 380/278 |
| 2007/0076884 A1* | 4/2007 | Wellbrock | H04L 9/0858 380/263 |
| 2008/0292095 A1* | 11/2008 | Vig | H04B 10/70 380/2 |
| 2010/0166187 A1* | 7/2010 | Trifonov | B82Y 10/00 380/279 |
| 2010/0293380 A1* | 11/2010 | Wiseman | H04L 9/0855 713/169 |
| 2010/0299526 A1* | 11/2010 | Wiseman | H04L 9/0855 713/171 |
| 2010/0329459 A1* | 12/2010 | Wiseman | H04B 10/70 380/256 |
| 2011/0064222 A1* | 3/2011 | Wiseman | H04L 9/0827 380/255 |
| 2011/0065384 A1* | 3/2011 | Cader | H04M 3/58 455/41.1 |
| 2011/0085666 A1* | 4/2011 | Hicks | H04L 9/0852 380/278 |
| 2011/0142242 A1 | 6/2011 | Tanaka | |
| 2011/0213979 A1* | 9/2011 | Wiseman | H04L 9/0844 713/171 |
| 2011/0228937 A1* | 9/2011 | Wiseman | H04L 9/0844 380/255 |
| 2011/0231665 A1* | 9/2011 | Wiseman | H04L 9/0838 713/181 |
| 2012/0059826 A1* | 3/2012 | Mate | G06F 16/739 707/737 |
| 2012/0060077 A1* | 3/2012 | Mate | G06F 16/739 715/200 |
| 2012/0195428 A1* | 8/2012 | Wellbrock | H04L 9/0855 380/255 |
| 2013/0083926 A1* | 4/2013 | Hughes | H04L 9/0836 380/278 |
| 2013/0101119 A1* | 4/2013 | Nordholt | H04L 9/083 380/256 |
| 2013/0101121 A1* | 4/2013 | Nordholt | H04L 9/0852 380/279 |
| 2013/0251145 A1* | 9/2013 | Lowans | H04L 9/0838 380/44 |
| 2014/0068765 A1* | 3/2014 | Choi | H04L 9/0852 726/23 |
| 2014/0188990 A1* | 7/2014 | Fulks | H04L 65/403 709/204 |
| 2014/0233739 A1* | 8/2014 | Grice | H04L 9/0855 380/278 |
| 2014/0341575 A1* | 11/2014 | Choi | H04B 10/70 398/51 |
| 2015/0083921 A1* | 3/2015 | Ooyabu | G01S 7/481 250/341.8 |
| 2015/0099505 A1* | 4/2015 | Kiukkonen | H04M 1/7253 455/419 |
| 2015/0188701 A1* | 7/2015 | Nordholt | H04L 9/0852 713/171 |
| 2015/0222619 A1* | 8/2015 | Hughes | H04L 63/08 713/168 |
| 2015/0326391 A1 | 11/2015 | Cho et al. | |
| 2015/0378683 A1* | 12/2015 | Pirvu | G07F 17/3223 708/255 |
| 2016/0248586 A1* | 8/2016 | Hughes | H04L 9/0852 |
| 2017/0324552 A1* | 11/2017 | Ahn | H04B 10/70 |
| 2017/0324553 A1* | 11/2017 | Ahn | G06Q 20/382 |

FOREIGN PATENT DOCUMENTS

| | | |
|---|---|---|
| JP | 2012-80496 A | 4/2012 |
| JP | 2012-213143 A | 11/2012 |
| JP | 2013-544479 A | 12/2013 |
| JP | 5631743 B2 | 11/2014 |
| KR | 10-2003-0051600 A | 6/2003 |
| KR | 10-2006-0031853 A | 4/2006 |
| KR | 10-2009-0124679 A | 12/2009 |
| KR | 10-2014-0055146 A | 5/2014 |

OTHER PUBLICATIONS

Christian Schmid, Pavel Trojek, Mohamed Bourennane, Christian Kurtsiefer, Marek Żukowski, and Harald Weinfurter, "Experimental Single Qubit Quantum Secret Sharing", Dec. 2, 2005, Physical Review Letters, vol. 95, Iss. 23.*

Marcos Curty and Norbert Lütkenhaus, Intercept-resend attacks in the Bennett-Brassard 1984 quantum-key-distribution protocol with weak coherent pulses, Jun. 1, 2005, Physical Review A, vol. 71, Issue 6.*

H. Bechmann-Pasquinucci, Andrea Pasquinucci, "Quantum key distribution with trusted quantum relay", Published in ArXiv 2005, obtained from https://arxiv.org/pdf/quant-ph/0505089.pdf, retrieved on Jun. 9, 2019.*

Kim, Jae-Wan, "Quantum Cryptography", Korea Institute of Information Security and Cryptology; 14(3), 8-12, English Abstract. Jun. 2004, 7 pages.

Noh, T.G. et al, "Quantum Cryptography", ETRI (May 10, 205) pp. 70-83, English Abstract, 15 pages.

* cited by examiner

MOBILE COMMERCE AND AUTHENTICATION METHOD HAVING IMPROVED SECURITY BASED ON QUANTUM CRYPTOGRAPHY

CROSS-REFERENCE TO RELATED APPLICATION

This application is a continuation of PCT/KR2016/000767 filed on Jan. 25, 2016, which claims priority to Korean Application No. 10-2015-0011411 filed on Jan. 23, 2015, which applications are incorporated herein by reference.

TECHNICAL FIELD

The present invention relates to technologies regarding a communication device and a server which are capable of cryptographic communication based on quantum cryptography, and more specifically to a quantum cryptography-based communication device and method in a communication device and a server, which are intended to enhance the security of an alternative payment system based on mobile commerce.

BACKGROUND ART

With the rapid expansion of the use of wired/wireless communication including Internet communication, issues related to the security of communication networks have become increasingly important in terms of the protection of the important secrets of nations, corporations, and banks and the protection of personal privacy. The asymmetric public key cryptosystem which was developed in the 1970s and is currently being widely used in communication systems, such as the Internet, etc., is a method designed to encrypt information by using a mathematically complex problem as a public key and to decrypt the information by using the solution to the problem as a private key, and is based on a mathematical "computational complexity" in principle.

As a representative, the RSA public key cryptosystem developed by the three persons, i.e., Rivest, Shamir, and Adleman, uses the difficulty of factoring very large numbers into primes. In other words, from a mathematical aspect, the factoring problem is based on the fact that as the size of a problem increases, computational time increases exponentially, with the result that when a sender and a receiver use the problem of factoring a sufficiently large number as a public key, it is practically impossible for an eavesdropper to decrypt a cryptogram. However, the security of the cryptosystem based on computational complexity is being questioned due to the development of more elaborate algorithms. Furthermore, as Peter Shor at AT&T developed a factoring algorithm using a quantum computer in 1994, it was proven that the RSA cryptosystem could be fundamentally cracked if a quantum computer was developed.

Quantum cryptography technology proposed as an alternative intended to overcome the above security problem has security based on the principle of quantum mechanics, i.e., the fundamental law of nature, rather than mathematical computational complexity, and thus it makes eavesdropping and monitoring difficult, with the result that it has attracted great attention recently. In other words, quantum cryptography technology is a technology designed to absolutely securely distribute a secret key (a one-time pad) between a sender and a receiver in real time based on the law of quantum physics, such as "the nonclonability of quantum information," and is also known as "quantum key distribution (QKD) technology."

The first quantum cryptography protocol was presented by C. H. Bennett at IBM and G. Brassard at the University of Montreal in 1984. This protocol named after the creators as the BB84 protocol uses four quantum states (for example, the polarization states of a single photon) constituting two bases.

One example of quantum cryptography technology is disclosed in the article "Quantum Cryptography Technology," Electronics and Telecommunication Trend Analysis, Vol. 20, No. 15, October 2005.

The prior art relates to quantum cryptography technology using the quantum system of a two-dimensional Hilbert space, i.e., a qubit (a quantum bit).

Conventional research and development into quantum cryptography technology focus chiefly on the efforts to improve the sensitivity and reliability of the reception of a quantum cryptogram. Accordingly, quantum cryptography technology has high barriers to the access of general users, which has been the reason for which quantum cryptography technology cannot be extended to various industrial fields notwithstanding that quantum cryptography technology has desirable security performance.

SUMMARY OF THE DISCLOSURE

Quantum cryptography technology has significantly high security because a signal is deconstructed when eavesdropping is performed and this technology has a nonclonable attribute. However, the high cost of the devices required to transmit and receive a quantum cryptogram has been an obstacle to the popularization of quantum cryptography technology for general users.

In particular, when a quantum cryptogram is received, the quantum cryptogram can be interpreted only when a polarization-controlled optical signal is received in a specific pattern and attenuated and then a single photon is detected by a single photon detector. The cost of the single photon detector is considerably high, and is thus an obstacle to popularization. Furthermore, it is difficult to fabricate a quantum cryptography receiver in a small size due to its characteristics, and thus it is difficult to install the quantum cryptography receiver in a general user terminal.

Conventional research and development into quantum cryptography technology focus chiefly on the efforts to improve the sensitivity and reliability of the reception of a quantum cryptogram. In conclusion, according to the conventional technology, quantum cryptography technology has high barriers to the access of general users.

An object of the present invention is to propose an authentication protocol using quantum cryptography via a relay between a mobile device and a server by improving part of an authentication process via quantum cryptography in order to be formed to be small and lightweight. An object of the present invention is to propose an authentication protocol using quantum cryptography between a mobile device and a server or relay and to propose an authentication method which can perform user authentication while maintaining high security in mobile commerce via the authentication protocol.

An object of the present invention is to provide mobile commerce via user authentication having security enhanced by generating secret keys between a communication device and a relay or server via quantum cryptography-based encryption communication between the communication device and the relay or server including a communication unit and sharing the generated secret keys with the communication device.

Furthermore, an object of the present invention is to provide mobile commerce via quantum cryptography and user authentication, which is applicable to an environment in which a wired communication method via an optical fiber or a free-space optical communication via a laser diode or photo diode can be used to send quantum cryptogram-based signals from a communication device to a relay or server.

Furthermore, an object of the present invention is to increase the security of a mobile payment application between a communication device and a relay or server via a quantum key distribution (QKD) method.

According to an aspect of the present invention, there is provided a communication device for quantum cryptography authentication, including: an optical communication unit configured to receive a series of first quantum signals generated by passing through a first quantum filter of the communication device, i.e., a receiver side; a quantum signal generation unit configured to generate the first quantum signals by setting up the first quantum filter in a reception path for a series of second quantum signals generated and sent by a server; and a processor configured to select the setup of the first quantum filter based on a series of randomly generated first quantum states, and to control the quantum signal generation unit to generate the first quantum signals by using the first quantum filter.

The processor may include: a random number generation unit configured to randomly generate the first quantum states based on random numbers; an encryption unit configured to send information about the first quantum filter to the server, to receive information about a second quantum filter used for the generation of the second quantum signals by the server, and to generate a secret key in conjunction with the server by using the information about the first quantum filter and the information about the second quantum filter; and a user authentication unit configured to perform user authentication in conjunction with the server by using the secret key.

In this case, there may be implemented an embodiment in which a polarization property is imparted to a photon used as a quantum signal, the photon is sent, and then the photon is measured and received using a polarization basis, and an embodiment in which a phase time difference is imparted to a photon and then the photon is measured and received using an interferometer. In the embodiment using polarization properties, the quantum filter may be a polarization basis, and the quantum signals may be polarized signals. In contrast, in the embodiment using phase time differences, the quantum filter may be a phase generator (a phase basis), and the quantum signals may be signals to which a phase time difference has been imparted.

The second quantum signals may have signal strength adjusted based on the distance between the server and the optical communication unit or between the server and the quantum signal generation unit.

The encryption unit may be further configured to send information about the characteristics of the optical communication unit or quantum signal generation unit to the server; and the second quantum signals may have signal strength adjusted based on the information about the characteristics of the optical communication unit or the quantum signal generation unit sent to the server.

The quantum signal generation unit may be further configured to receive the second quantum signals from the server by using a free-space optical communication in which the distance to the server is within a reference distance.

The random number generation unit may be further configured to randomly generate the first quantum states by using a quantum random number generator (QRNG).

According to another aspect of the present invention, there is provided a server for quantum cryptography communication, the server including: a quantum signal generation unit configured to generate a series of first quantum signals by using a first quantum filter of the server, i.e., a sending side; an optical communication unit configured to send the first quantum signals to a communication device; a processor configured to select the setup of the first quantum filter based on a series of randomly generated first quantum states, to control the quantum signal generation unit to generate the first quantum signals by using the first quantum filter, and to control the optical communication unit to adjust the signal strength of the first quantum signals based on a condition of communication with the communication device.

The processor may include: a random number generation unit configured to randomly generate the first quantum states based on random numbers; an encryption unit configured to send information about the first quantum filter to the communication device, to receive information about a second quantum filter used for the generation of second quantum signals from the first quantum signals by the communication device, and to generate a secret key in conjunction with the communication device by using the information about the first quantum filter and the information about the second quantum filter; and a user authentication unit configured to perform user authentication in conjunction with the communication device by using the secret key.

The processor may be further configured to adjust the signal strength of the first quantum signals based on the distance between the communication device and the optical communication unit or between the communication device and the quantum signal generation unit.

The processor may be further configured to adjust the signal strength of the first quantum signals based on the quantum signal reception characteristics of the communication device.

The optical communication unit may be further configured to send the first quantum signals to the communication device by using a free-space optical communication in which the distance to the communication device is within a reference distance.

The optical communication unit may be further configured to receive optical signals, i.e., the original forms of the first quantum signals, from a secondary server; and the processor may be further configured to control the optical communication unit to adjust the signal strength of the first quantum signals through the attenuation of the optical signals based on the condition of the communication with the communication device.

According to still another aspect of the present invention, there is provided a quantum cryptography authentication method for a communication device, the method including: randomly generating a series of first quantum states based on random numbers; selecting a first quantum filter generating a series of first quantum signals based on the first quantum states; generating the first quantum signals by setting up the first quantum filter in a reception path for a series of second quantum signals generated and sent by a server; receiving the first quantum signals generated by passing through the first quantum filter; sending information about the first quantum filter to the server, and receiving information about a second quantum filter used for the generation of the second quantum signals by the server; generating a secret key in conjunction with the server by using the information about the first quantum filter and the information about the second quantum filter; and performing user authentication in conjunction with the server by using the secret key.

According to still another aspect of the present invention, there is provided a quantum cryptography authentication method for a server, the method including: randomly generating a series of first quantum states based on random numbers; selecting the setup of a first quantum filter based on the first quantum states; generating a series of first quantum signals by using the first quantum filter; adjusting the signal strength of the first quantum signals based on a condition of communication with a communication device; sending the first quantum signals to the communication device; sending information about the first quantum filter to the communication device, and receiving information about a second quantum filter used for generation of second quantum signals from the first quantum signals by the communication device; generating a secret key in conjunction with the communication device by using the information about the first quantum filter and the information about the second quantum filter; and performing user authentication in conjunction with the communication device by using the secret key.

The adjusting may include adjusting the signal strength of the first quantum signals based on the distance between the communication device and the server.

The adjusting may include adjusting the signal strength of the first quantum signals based on the quantum signal reception characteristics of the communication device.

The quantum cryptography authentication method may further include receiving optical signals, i.e., the original forms of the first quantum signals, from a secondary server; and the adjusting may include adjusting the signal strength of the first quantum signals through the attenuation of the optical signals based on the condition of the communication with the communication device.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing a conventional quantum cryptography method;

FIG. 2 is a view showing a method of identifying eavesdropping via conventional quantum cryptography;

DETAILED DESCRIPTION OF THE DISCLOSURE

Figure 3:
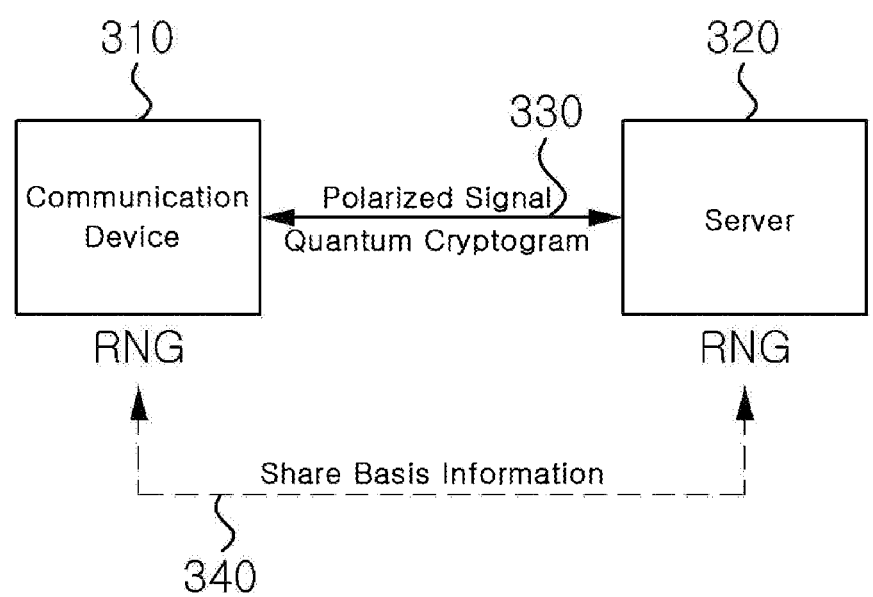
FIG. 3 is a diagram showing the communication relationship between a communication device and a server according to an embodiment of the present invention.

The above and other objects, features and advantages of the present invention will be more clearly understood from the following detailed description of embodiments taken in conjunction with the accompanying drawings.

The embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

Figure 1:
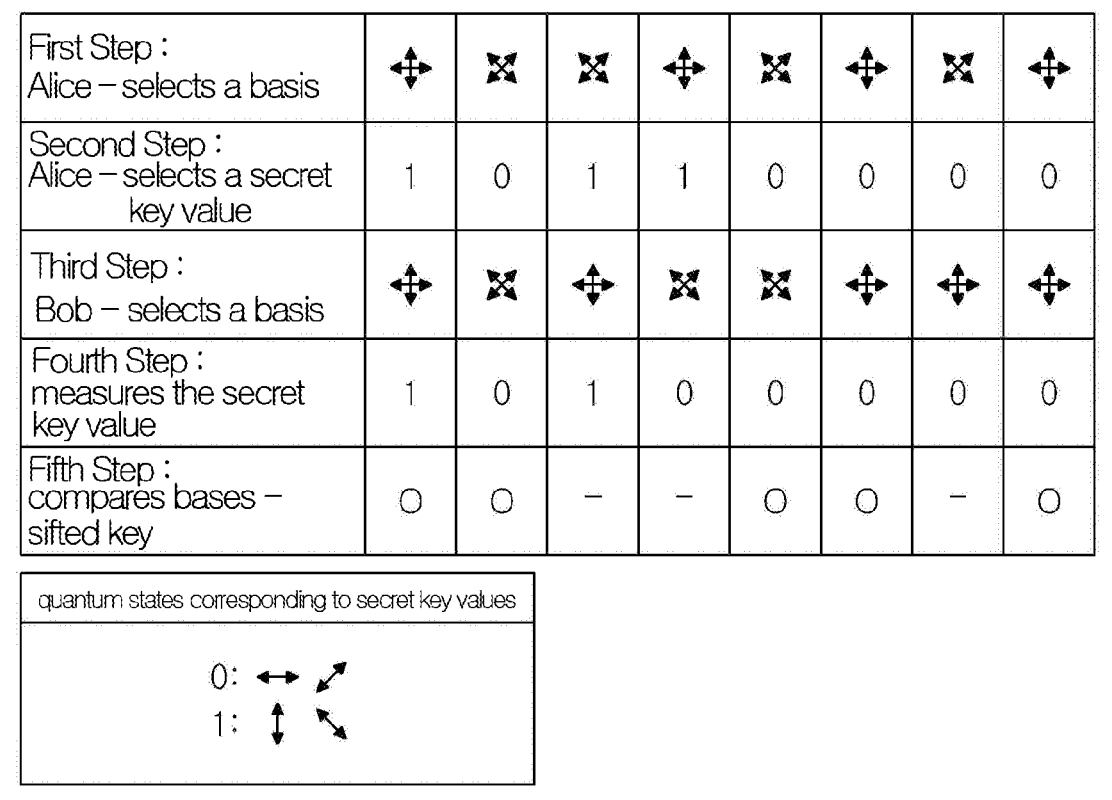

FIG. 1 is a view showing a conventional quantum cryptography method. It will be apparent to those skilled in the art that the quantum cryptography technique shown in FIG. 1 can be used for the implementation of the present invention within the range in which the spirit of the present invention is not impaired and the range of the rights of the present invention is not reduced.

The first quantum cryptography protocol was presented by C. H. Bennett at IBM and G. Brassard at the University of Montreal in 1984. This protocol named after the creators as the BB84 protocol uses four quantum states (for example, the polarization states of a single photon) constituting two bases, as shown in FIG. 1.

In other words, a sender Alice randomly selects one of two bases, i.e., ✛ or ✖, at a first step, and randomly selects one of the two quantum states (secret key values), i.e., 0 and 1, of this selected basis and sends the selected quantum state to a receiver Bob at a second step. The receiver Bob who has received the quantum state also randomly selects one of the two bases at a third step, and measures/determines the received quantum state by using this selected basis at a fourth step. After the receiver Bob has performed the measurement, the sender Alice and the receiver Bob reveal the bases, randomly selected by themselves, to each other. When the basis selected by the sender Alice and the basis selected by the receiver Bob are the same, the result measured by the receiver Bob is the same as the quantum state randomly selected by the sender Alice, and thus it is determined that the two users have the same secret keys (sifted keys) at a fifth step.

Figure 2:
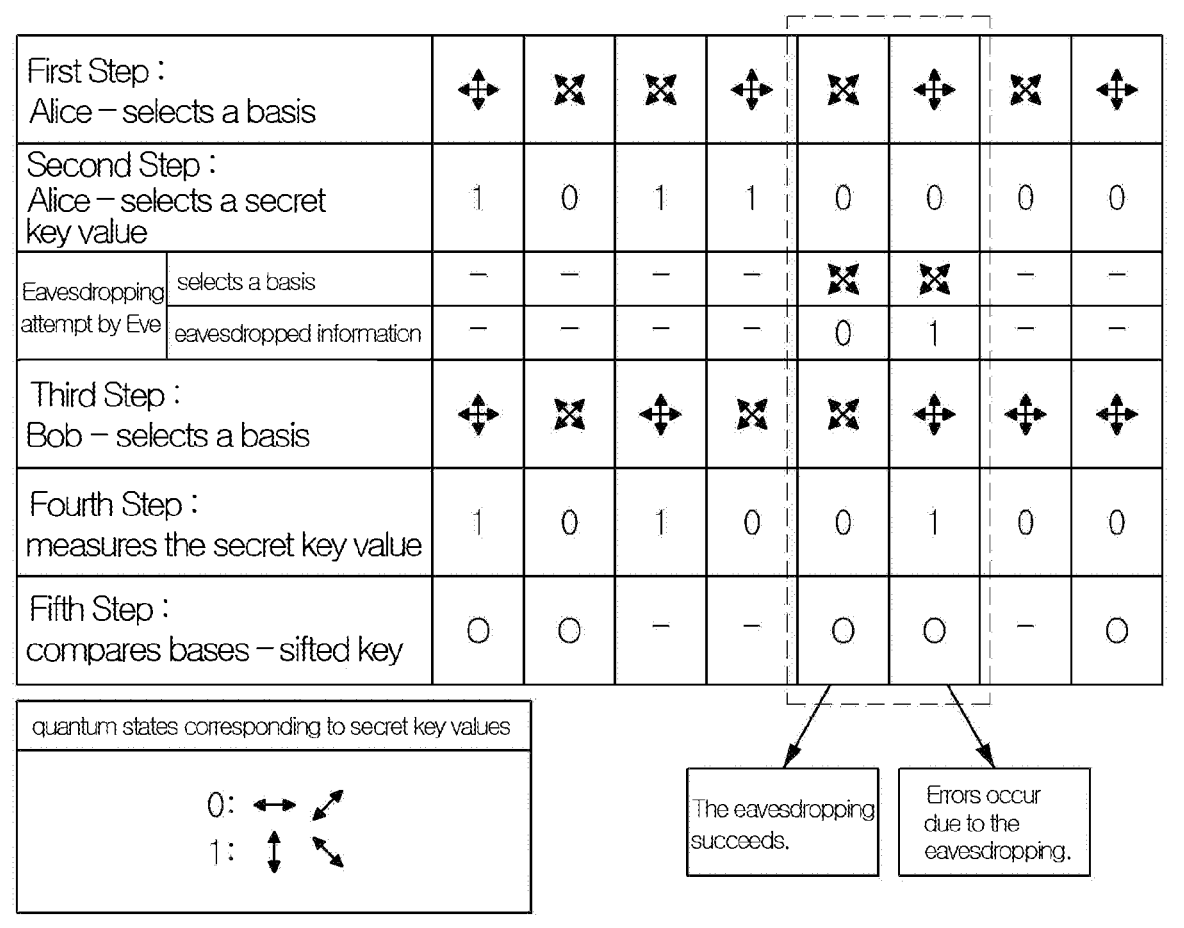

FIG. 2 is a view showing a method of identifying eavesdropping via conventional quantum cryptography. It will be apparent to those skilled in the art that the quantum cryptography technique shown in FIG. 2 can be used for the implementation of the present invention within the range in which the spirit of the present invention is not impaired and the range of the rights of the present invention is not reduced.

Referring to FIG. 2, during the quantum cryptography process from the first step to the fifth step described with reference to FIG. 1, if an eavesdropper Eve attempts eavesdropping, errors occur in secret key values obtained by the two users Alice and Bob according to the basic principle of quantum mechanics. The sender Alice and the receiver Bob reveal parts of generated keys to each other, and then the ratio of errors is calculated, thereby determining whether the eavesdropper Eve is present.

There may be implemented an embodiment in which a polarization property is imparted to a photon used as a quantum signal, the photon is sent, and then the photon is measured and received using a polarization basis, as shown in FIGS. 1 and 2. Furthermore, there may be implemented another embodiment in which a phase time difference is imparted to a photon and then the photon is measured and received using an interferometer. In the embodiment using polarization properties, a quantum filter may be a polarization basis, and a quantum signal may be a polarized signal. In contrast, in the embodiment using phase time differences, a quantum filter may be a phase generator, and a quantum signal is a signal to which a phase time difference has been imparted.

For example, a phase time difference-based phase filter may have a phase delay value of 90/270 degrees or 0/180 degrees according to a randomly generated quantum state. In other words, a phase generator (a phase filter) having a phase delay value of 90/270 degrees may correspond to the quantum state "0," and a phase generator having a phase delay value of 0/180 degrees may correspond to the quantum state "1."

According to a secret key value, a quantum signal having one of specific quantum signal values, i.e., 90 and 270 degrees, or 0 and 180 degrees, within a predetermined phase generator may be generated.

In the generation of a quantum signal, the method using polarization properties and the method using phase time differences are well known, and are equivalent to each other. In the implementation of the spirit of the present invention, there is no substantial difference between the method using polarization properties and the method using phase time differences. The spirit of the present invention is not limited by the selection of one of these methods.

For ease of description, the process of generating and measuring a quantum signal is described with a focus on the method using polarization properties below. It will be apparent to those skilled in the art that the spirit of the present invention is not limited only to technology using polarization properties by the following embodiments.

FIG. 3 is a diagram showing the communication relationship between a communication device and a server according to an embodiment of the present invention.

A communication device 310 according to the present invention may be a mobile device or a personal terminal, generates a quantum cryptogram, and shares basis information, used for the generation of the quantum cryptogram, with a server 320. In an embodiment, the server 320 may function as Alice of FIGS. 1 and 2, and the communication device 310 may function as Bob of FIGS. 1 and 2. In another embodiment, the communication device 310 may function as Alice, and the server 320 may function as Bob. Furthermore, there may be an embodiment in which each of the communication device 310 and the server 320 may function as Alice who generates quantum cryptogram and may also function as Bob who receives a quantum cryptogram generated by its counterpart.

Polarized signals including the quantum cryptogram generated by the communication device 310 are transferred to the communication server 320 via an optical communication channel 330, and the basis information used for the generation of the quantum cryptogram by the communication device 310 may be shared via a general communication network 340 between the communication device 310 and the communication server 320. The server 320 receives and interprets the polarized signals, in which case basis information used for the interpretation of the polarized signals may be shared with the communication device 310 via the communication network 340.

Since the communication device 310 also includes an optical receiver module, it may receive the polarized signals including a quantum cryptogram, generated by the server 320, via the optical communication channel 330. In this case, the state values of the polarized signals may be changed while the polarized signals are passing through a polarization filter, polarized signals sent by a sending side may be referred to as first polarized signals, and polarized signals received by a receiver side through a polarization filter may be referred to as second polarized signals, for ease of description.

In this case, the communication device 310 may send the polarized signals including the quantum cryptogram to the server 330 via an optical fiber capable of optical communication, and may receive the polarized signals including a quantum cryptogram. Meanwhile, when the communication device 310 is a mobile device, the polarized signals including the quantum cryptogram may be sent from the communication device 310 by using a free-space optical communication, and may be received by the communication server 320. Furthermore, polarized signals may be sent along the reverse path. In this case, the free-space optical communication refers to an optical communication technique that is used in an environment in which polarized signals sent by the communication device 310 can directly reach the server 320 without an obstacle in the path from the communication device 310 to the server 320. The free-space optical communication may be viewed as a direct face-to-face method. The communication device 310 may send the polarized signals by using a laser diode (LD) or a photo diode (PD).

Furthermore, the communication device 310 and the server 320 may share the polarization basis information, used for the generation of the quantum cryptogram by each of the communication device 310 and the server 320, with each other via the general communication network 340 including a wired communication network and a wireless communication network. In this case, each of the communication device 310 and the communication server 320 may generate the polarization basis information based on a series of quantum states randomly generated by the random number generation unit RNG of each of the communication device 310 and the communication server 320, and may share the polarization basis information with the other party. In this case, the generation of random numbers may be performed using a quantum random number generator (QRNG) in order to achieve more complete randomness.

Although FIG. 3 shows an embodiment in which a quantum cryptogram is sent directly from the communication device 310 to the server 320 or from the server 320 to the communication device 310, the spirit of the present invention is not limited thereto, but an embodiment using a method in which a relay relays and transfers polarized signals may be implemented. An embodiment of the relay method will be described using FIGS. 6 to 9 later.

Figure 4:
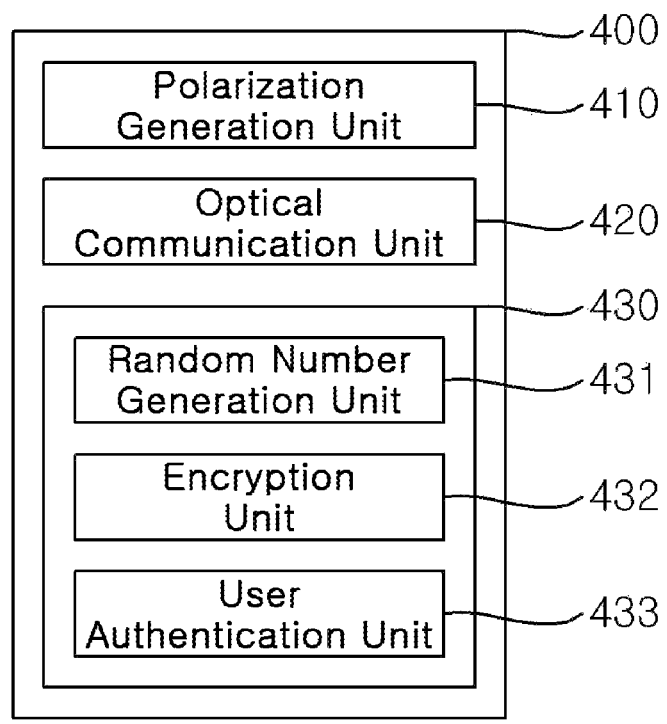
FIG. 4 is a diagram showing a communication device according to an embodiment of the present invention in detail.

FIG. 4 is a diagram showing a communication device 400 according to an embodiment of the present invention in detail.

The communication device 400 includes a polarization generation unit 410, an optical communication unit 420, and a processor 430, and the processor 430 includes a random number generation unit 431, an encryption unit 432, and a user authentication unit 433.

The polarization generation unit 410 may refer to a polarization filter, and generates a series of first polarized signals by using a first polarization basis. In this case, the first polarization basis may be described based on the polarization bases shown in FIGS. 1 and 2. For ease of description, a 0 degree-based basis or a 45 degree-based basis shown in FIGS. 1 and 2 may be used. The first polarized signals refer to signals formed by passing a series of bits (the secret key of FIGS. 1 and 2), randomly generated to have a value of 0 or 1, through a polarization filter.

The optical communication unit 420 may send the series of first polarized signals, generated by the polarization generation unit 410, to a server, and the server may receive second polarized signals generated in such a manner that the first polarized signals pass through a second polarization basis. Furthermore, the server may generate a series of third polarized signals by using a third polarization basis, and may transmit the series of third polarized signals. In this case, the optical communication unit 420 may receive the series of third polarized signals, generated by the server, through a fourth polarization basis. In this case, the transmission and reception of the polarized signals between the communication device 400 and the server may be directly performed without the intervention of a relay, or the polarized signals may be transferred via a relay.

In this case, the optical communication unit 420 may send the series of polarized signals to the server by using a free-space optical communication, and may receive the series of polarized signals from the server by using a free-space optical communication. The free-space optical communication refers to optical communication based on a direct face-to-face method. In this case, the distance between the optical communication unit 420 and the server may be made equal to or smaller than a reference distance. This may be viewed as proximity free-space optical communication.

In this case, a laser diode or photo diode does not require high output. It is sufficient if the laser diode or photo diode has only enough output to send a quantum cryptogram via free-space optical communication or direct face-to-face optical communication between the communication device 400 and the server or relay.

For example, when the distance between the communication device 400 and the relay or server is within 10 cm, it will be sufficient if a laser diode or photo diode having enough output to send and receive a quantum cryptogram without loss is installed in the communication device 400.

The relay or server may be implemented in the form of an automatic teller machine (ATM) or a point of sales (POS) terminal, or may be implemented in the form of a set-top box in a general home or office. In this case, since a user can bring the terminal 400 maximally close to the relay or server, the distance between the terminal 400 and the relay or between the terminal 400 and the server may be a short distance within 10 cm. When the terminal 400 is in the close proximity of the relay or server, possibility that external eavesdropping occurs between the terminal 400 and the relay or server is low, and thus the probability of eavesdropping on a quantum cryptogram between the terminal 400 and the relay or server becomes significantly low.

When a proximity free-space optical communication is applied between the terminal 400 and the relay or server, the output of the optical communication unit 420 installed in the terminal 400 does not need to be high, and the receiver module of the optical communication unit 420 may be also implemented using hardware with low specifications. In particular, in order to receive a quantum cryptogram, an expensive detector and attenuator capable of single photon-based detection from polarized signals are required. In this case, when it is expected that the communication distance between the terminal 400 and the relay or server is within a reference distance, the output of optical signals sent by the server or relay can be optimized, and quantum cryptography and authentication functions can be implemented even when an attenuator and a detector having minimum specifications are installed in the terminal 400.

The processor 430 may select the first polarization basis based on the series of randomly generated first quantum states, and control the polarization generation unit 410 to generate the series of first polarized signals by using the first polarization basis.

The processor 430 may select the fourth polarization basis based on the series of randomly generated fourth quantum states. The processor 430 may control the polarization generation unit 410 so that the optical communication unit 420 can receive the fourth polarized signals which are generated in such a manner that the third polarized signals sent from the server pass through the fourth polarization basis.

Furthermore, the processor includes the random number generation unit 431, the encryption unit 432, and the user authentication unit 433, and the random number generation unit 431 randomly generates the series of first quantum states or the series of fourth quantum states based on random numbers. In this case, the random number generation unit 431 may further increase the randomness of the quantum states by using a QRNG.

The encryption unit 432 may control the communication module of the communication device to send information about the first polarization basis to the server. In this case, the communication module is a module using the general wired/wireless communication of the communication device. In this case, the communication module uses wired/wireless communication, and generates a first secret key based on the information about the first polarization basis and the information about the second polarization basis.

The user authentication unit 433 performs user authentication in conjunction with the server by using the generated first secret key or a second secret key generated from a quantum cryptogram received from the server.

In this case, the process of sharing the information about the first polarization basis, the information about the second polarization basis, the information about the third polarization basis and the information about the fourth polarization basis or transferring information about whether the user authentication is successful may be performed via a common wired communication network or a wireless communication network. The first secret key includes quantum cryptograms which have been sent by the terminal 400 and whose stable reception has been confirmed by the server 500. The second secret key includes quantum cryptograms which have been sent by the server 500 and whose stable reception has been confirmed by the terminal 400. The first secret key and the second secret key are known only to the terminal 400 and the server 500, and thus the eavesdropping/monitoring of a third party is impossible.

Accordingly, a user may apply a user authentication technique using a quantum cryptogram to a mobile commerce payment system which performs a transaction, such as remittance, payment or the like, requiring the authentication of the user.

Figure 5:
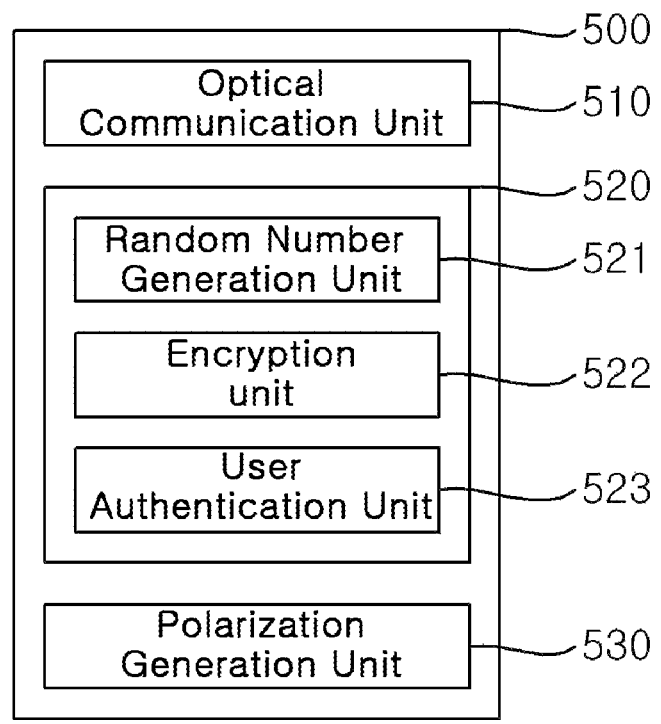
FIG. 5 is a diagram showing a server for quantum cryptography authentication according to an embodiment of the present invention in detail.

FIG. 5 is a diagram showing a server 500 for quantum cryptography authentication according to an embodiment of the present invention in detail.

The server 500 for quantum cryptography authentication includes an optical communication unit 510, a processor 520, and a polarization generation unit 530, and the processor 520 includes a random number generation unit 521, an encryption unit 522, and a user authentication unit 523.

In this case, the server 500 may include a fixed terminal configured to enable banking, finance or card payment and equipped with a security function, such as a POS terminal, or a bank ATM terminal, without limitations. The server 500 shares information, obtained through communication and authentication in conjunction with the relay 620 and the communication device 400, with a service provider (SP) who provides card, finance or banking service, or the like, thereby performing a payment, banking, or finance transaction.

The server 500 performs mutual authentication with the communication device 400, and does not need to be a final server for authentication and a transaction. In other words, a secondary server held by an SP may finally approve a transaction, and the server 500 may perform only the user authentication of the communication device 400.

The processor 520 may determine the polarization characteristics of the polarization generation unit 530.

The processor 520 may include a random number generation unit 521, an encryption unit 522, and a user authentication unit 523. In this case, the random number generation unit 521 may generate a series of quantum states based on random numbers.

When the first polarized signals are sent based on the first polarization basis generated based on the first quantum states from the communication device 400, the first polarized signals are reconstructed as the second polarized signals while passing through the second polarization basis of the polarization generation unit 530. In this case, the second polarization basis may be generated based on the second quantum states generated by the random number generation unit 521.

Meanwhile, the random number generation unit 521 may generate a series of third quantum states based on other random numbers. The processor 520 may control the polarization generation unit 530 based on the third quantum states so that the polarization generation unit 530 has a polarization characteristic corresponding to the third polarization basis. The optical communication unit 530 may send the third polarized signals having passed through the third polarization basis.

In turn, the third polarized signals may be reconstructed as fourth polarized signals while passing through the fourth polarization basis based on the fourth quantum states generated by the communication device 400.

The communication device 400 has information about fifth quantum states constituting the secret key, i.e., the original form of the first polarized signals. In contrast, the communication device 400 does not have all information about a secret key, i.e., an original form, with respect to the fourth polarized signals, and may recognize only quantum states for fourth polarized signals whose reception and measurement have been successful.

In contrast, the server 500 has information about the sixth quantum states constituting a secret key, i.e., the original form of the third polarized signals. Meanwhile, the server 500 does not have all information about a secret key, i.e., an original form, with respect to the second polarized signals, and may recognize only quantum states for second polarized signals whose reception and measurement have been successful.

For both sides to use a sent and received quantum cryptogram as valid information, information about polarization bases used by the both sides need to be shared. This process may be performed via general wired/wireless communication, such as TCP/IP, Wi-Fi, or Bluetooth communication or the like, which corresponds to well-known communication technology, rather than optical communication.

The encryption unit 522 may control the communication module (not shown) of the server 500 to send the information about the second polarization basis and the information about the third polarization basis to the communication device 400, and may identify the information about the first polarization basis and the information about the fourth polarization basis from information received from the communication device 400.

The encryption unit 522 may generate a first secret key (a secret key obtained from a quantum cryptogram transferred from the communication device 400 to the server 500) by combining the information about the first polarization basis and the information about the second polarization basis with information about the quantum states for the second polarized signals whose measurement has been successful.

The encryption unit 522 may generate a second secret key (a secret key obtained from a quantum cryptogram transferred from the server 500 to the communication device 400) by combining the information about the third polarization basis and the information about the fourth polarization basis with the information about the sixth quantum states constituting the secret key, i.e., the original form of the third polarized signals.

The user authentication unit 523 may perform user authentication in conjunction with the communication device 400 by using at least one of the first secret key and the second secret key. In other words, the user authentication may be performed using any one of the first secret key and the second secret key or using the combination of the first secret key and the second secret key.

The optical communication unit 510 of the server 500 may include a separate amplifier or attenuator (not shown) configured to adjust the signal strength of polarized signals. Furthermore, the server 500 may further include a separate measurement means (not shown) configured to measure the distance to the communication device 400. An example of the distance measurement means may be an embodiment which is configured to send an optical signal in the infrared band, to receive a reflected infrared signal, and to measure a distance. Alternatively, there may be implemented an embodiment which is configured to detect the proximity of the communication device 400 based on a change in electric field by using a capacitive sensor.

After the server 500 has detected the distance to the communication device 400, the processor 520 may control the optical communication unit 510 to send polarized signals, having sufficient signal strength for the optical receiver module of the communication device 400 to appropriately filter and measure the polarized signals based on a photon, to the communication device 400.

In this case, the processor 520 may receive information about the sensitivity or filtering specifications of the optical receiver module of the communication device 400 from the communication device 400 via a general wired/wireless communication network. When the optical communication unit 510 sends polarized signals to the communication device 400, the processor 520 may adjust the transmission signal strength of the polarized signals based on the information about the sensitivity or filtering specifications of the optical receiver module of the communication device 400.

An authentication process using quantum cryptography can be performed by the interactions between the communication device 400 and the server 500 even when a relatively inexpensive optical transmission module and optical receiver module are installed in the communication device 400. This enables the cost of the application of an authentication technique using quantum cryptography to mobile commerce to be significantly reduced.

Figure 6:
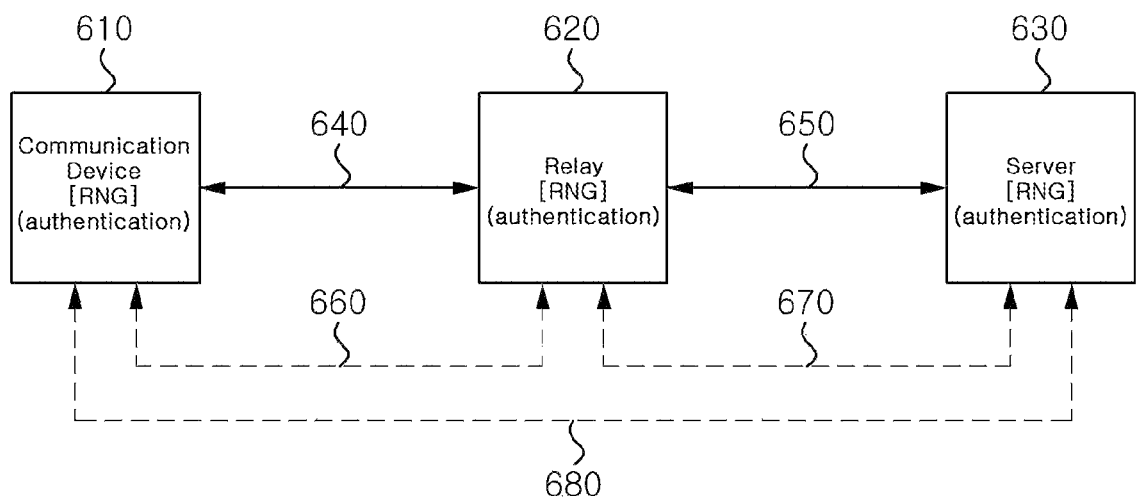
FIG. 6 is a diagram showing a quantum cryptography-based communication and user authentication network system including a relay according to an embodiment of the present invention.

FIG. 6 is a diagram showing a quantum cryptography-based communication and user authentication network system including a relay according to an embodiment of the present invention. Referring to FIG. 6, there is shown the communication and user authentication network system in which each of the relay 620 and the communication server 630 performs independent user authentication.

The communication and user authentication network system of FIG. 6 includes a communication device 610, a relay 620, and a server 630. In this case, each of the communication device 610, the relay 620, and the server 630 may include an RNG.

The communication device 610 selects a first polarization basis based on a series of randomly generated first quantum states, and sends a series of first polarized signals, generated based on the first polarization basis, to the relay 620 by using a free-space optical communication channel 640.

In this case, the communication device 610 includes an optical receiver module, and may receive polarized signals including a quantum cryptogram, generated by the relay 620, via the optical communication channel 640. In this case, the state values of the polarized signals may be changed while the polarized signals are passing through a polarization filter, polarized signals sent by a sending side may be referred to as first polarized signals, and polarized signals received by a receiver side through a polarization filter may be referred to as second polarized signals, for ease of description.

The relay 620 may include modules, such as an optical receiver unit 510 and optical transmission unit 520 shown in conjunction with the server 500 of FIG. 5. The relay 620 may determine a second polarization basis based on a series of second quantum states generated by the RNG. The relay 620 obtains second polarized signals by passing the first polarized signals, received via the optical communication channel 640, through the second polarization basis.

Thereafter, the communication device 610 and the relay 620 share information about the first polarization basis generated by the communication device 610 and information about the second polarization basis generated by the relay 620 via a wired/wireless communication network 660.

Meanwhile, the relay 620 determines a third polarization basis based on a series of third quantum states generated by an RNG, and sends third polarized signals based on the third polarization basis to the communication device 610 via the optical communication channel 640.

Each of the communication device 610 and the relay 620 may generate a first secret key between the communication device 610 and the relay 620 by using a quantum cryptography, whose measurement has been successfully performed by a receiver side, based on information about the first polarization basis and information about the second polarization basis, and may generate a second secret key based on third polarization basis information and fourth polarization basis information, as described in conjunction with the process of sharing a secret key shown in FIG. 5. The communication device 610 and the relay 620 may share the first secret key and the second secret key with each other. The relay 620 may perform first user authentication in conjunction with the communication device 610 by using any one or both of the first secret key and the second secret key.

Since the server 630 includes its own separate RNG, the server 630 may determine a seventh polarization basis through the separate generation of random numbers. In this case, the relay 620 may transfer the second polarized signals to the server 630 by using the optical communication channel 650, and the server 630 may obtain fifth polarized signals by passing the second polarized signals through the seventh polarization basis. In this case, the optical communication channel 650 may be an optical cable, a free-space optical communication channel, or an optical communication channel passing through a satellite.

In this case, the relay 620 may transfer the second secret key obtained from the quantum cryptogram generated by the relay 620, the first secret key generated by the communication device 610, and information about the result of the first user authentication to the server 630 via the wired/wireless communication network 670. However, to send the first secret key and the second secret key, the wired/wireless communication network 670 may be a dedicated channel which maintains complete security and is separated from the outside. The server 630 may complete the authentication of the user by integrating the result of second user authentication to be described later with the result of the first user authentication, and may request a transaction from an SP who provides payment, banking or finance service, or the like.

In this case, the communication device 610 and the server 630 may share the first polarization basis information generated by the communication device 610 and the seventh polarization basis information generated by the server 630 with each other via a wired/wireless communication network 680.

Accordingly, the server 630 may generate a third secret key between the communication device 610 and the server 630 based on the information about the first polarization basis and the information about the seventh polarization basis, and may share the third secret key with the communication device 610. The server 630 may perform the second user authentication based on the third secret key.

In this case, the server 630 may transfer information about the result of the second user authentication to the relay 620 via the wired/wireless communication network 670.

Alternatively, according to another embodiment of the present invention, the relay 620 may transfer the second polarized signals, generated in such a manner that the series of first polarized signals generated based on the first polarization basis and sent by the communication device 610 pass through the second polarization basis at the relay 620, to the server 630 via the optical communication channel 650, in which case information about the first polarization basis and information about the second polarization basis may be simultaneously transferred to the server 630 via the wired/wireless communication network 670.

Accordingly, the server 630 may generate a fourth secret key between the communication device 610 and the server 630 based on the information about the first polarization basis, the information about the second polarization basis, and the information about the third polarization basis, and may share the fourth secret key with the communication device 610. The server 630 may process second user authentication.

In this case, the server 630 may transfer information about the result of the second user authentication to the relay 620 via the wired/wireless communication network 670.

In this case, the information about the first polarization basis at the communication device 610 may be transferred from the communication device 610 via the wired/wireless communication network 680 to the server 630.

Polarized signals including a quantum cryptogram may be also generated and transferred to the relay 620 via the optical communication channel 650 by the server 630. The second user authentication is authentication between the server 630 and the communication device 610. Accordingly, to perform the second user authentication, it is preferred that the polarized signals generated by the server 630 are transferred to the optical communication channel 640 through the relay 620 without change in quantum state.

In this case, the relay 620 may adjust the signal strength of the polarized signals received from the optical communication channel 650 and then send the adjusted polarized signals to the optical communication channel 640. The relay 620 may adjust the signal strength of the polarized signals to be sent to the optical communication channel 640 based on the sensitivity of the optical receiver module of the communication device 610, the performance of the attenuator of the optical receiver module, and the performance of photon detection of the optical receiver module. Furthermore, the relay 620 may adjust the signal strength of the polarized signals to be sent to the optical communication channel 640 based on the distance between the communication device 610 and the relay 620.

Figure 7:
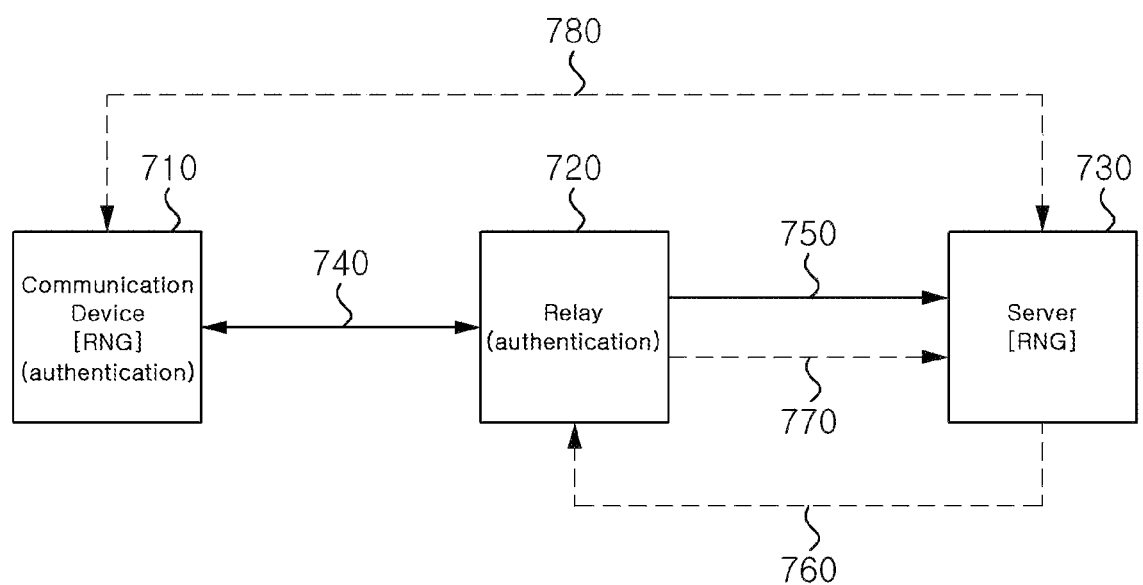
FIG. 7 is a diagram showing a quantum cryptography-based communication and user authentication network system including a relay according to another embodiment of the present invention.

FIG. 7 is a diagram showing a quantum cryptography-based communication and user authentication network system including a relay according to another embodiment of the present invention. Referring to FIG. 7, there is shown the communication and user authentication network system in which a relay 720 performs a quantum cryptography-based user authentication.

The communication and user authentication network system of FIG. 7 includes a communication device 710, a relay 720, and a server 730.

Since the communication device 710 of FIG. 7 performs the same function as the communication devices 310, 400 and 610 of FIGS. 3, 4 and 6, a redundant description thereof is omitted below. The relay 720 and server 730 of FIG. 7 are described with a focus on functions unique to the embodiment of FIG. 7, and redundant descriptions thereof are omitted below. The optical communication channel 740 may be viewed as having the same configuration as the optical communication channel 640 of FIG. 6.

In FIG. 7, there is shown an embodiment in which an RNG is included in the server 730 but an authentication process using quantum cryptography is performed by the relay 720. In other words, the relay 720 includes an optical receiver module configured to receive first polarized signals, but does not include an RNG. Accordingly, the relay 720 receives second quantum state-based second polarization basis information, generated by the RNG of the server 730, from the server 730.

The second polarization basis information is transferred from the server 730 via a wired/wireless communication network 760 to the relay 720, and is shared with the communication device 710 via a wired/wireless communication network 780.

For the relay 720 to perform user authentication, first polarization basis information needs to be shared with the relay 720. The first polarization basis information may be transferred from the communication device 710 via a wired/wireless communication network (not shown) to the relay 720, or may be transferred from the communication device 710 via the wired/wireless communication network 780 to the server 730 and then transferred from the server 730 via the wired/wireless communication network 760 to the relay 720.

The result of user authentication performed by the relay 720 or a secret key may be transferred to the server 730 via a separate communication channel 770 maintaining security. Meanwhile, according to an embodiment of the present invention, the relay 720 may re-transfer second polarized signals to the server 730 via an optical communication channel 750. The server 730 may directly receive the second polarized signals, thereby re-checking the result of the user authentication performed by the relay 720. However, the possibility that an authentication process performed by the relay 720 might influence the quantum cryptogram needs to be taken into consideration.

Since the secret key may be obtained based on quantum cryptograms, the first polarization basis information and the second polarization basis information, the relay 720 having directly received the quantum cryptograms and the communication device 710 having generated the quantum cryptograms may share the secret key with each other in principle. To share the secret key with the server 730, the secret key may be transferred to the server 730 under a special condition, such as the condition of the separate communication channel 770 maintaining security, as described above.

Figure 8:
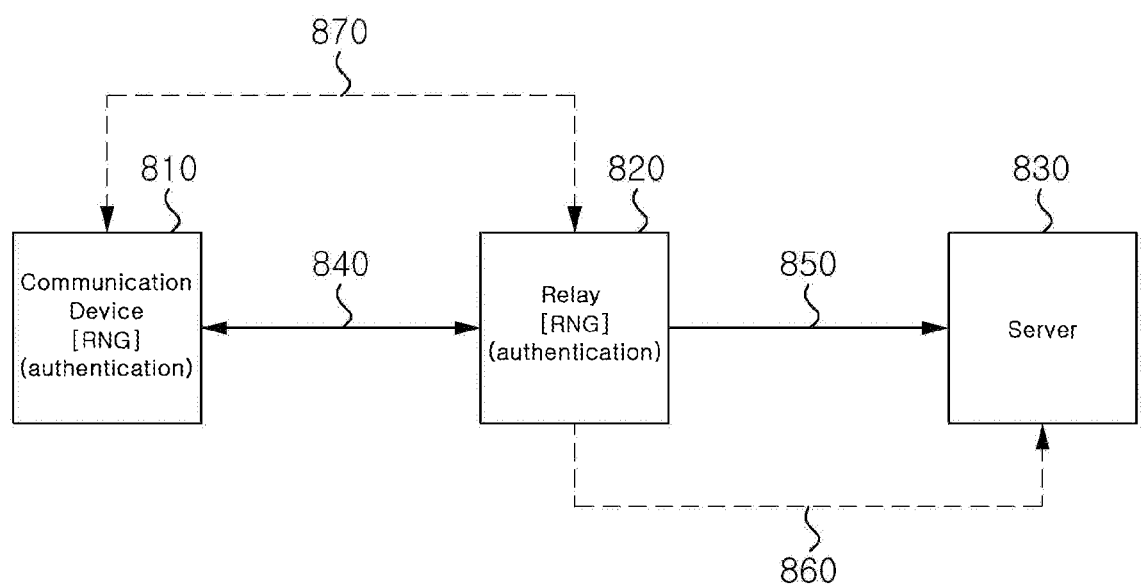
FIG. 8 is a diagram showing a quantum cryptography-based communication and user authentication network system including a relay according to still another embodiment of the present invention.

FIG. 8 is a diagram showing a quantum cryptography-based communication and user authentication network system including a relay according to still another embodiment of the present invention. The communication and user authentication network system of FIG. 8 corresponds to an embodiment in which random number generation and authentication processes are performed by a relay 820.

Referring to FIG. 8, an optical communication channel 840 transfers first polarized signals including a quantum cryptogram, generated by a communication device 810, to the relay 820, and transfers third polarized signals including a quantum cryptogram, generated by the relay 820, to the communication device 810. Since the relay 820 may generate quantum states by itself, it may generate second polarization basis information and third polarization basis information by itself.

The communication device 810 and the relay 820 may share first polarization basis information and the second polarization basis information via a wired/wireless communication network 870, may generate a secret key, and may perform quantum cryptography-based user authentication.

The relay 820 may transfer the result of the quantum cryptography-based user authentication to a server 830 via a wired/wireless communication network 860. The server 830 may generates a substantial transaction in conjunction with a service provider who provides banking, finance, or payment service, or the like, as described above.

In an embodiment, an optical communication channel 850 may deliver second polarized signals, received by the relay 820, to the server 830, or may deliver polarized signals, generated based on a new quantum cryptogram, to the server 830. Not only the result of the user authentication but also a secret key may be transferred to the server 830 via the wired/wireless communication network 860, in which case the communication network 860 needs to be a special communication network maintaining security.

Figure 9:
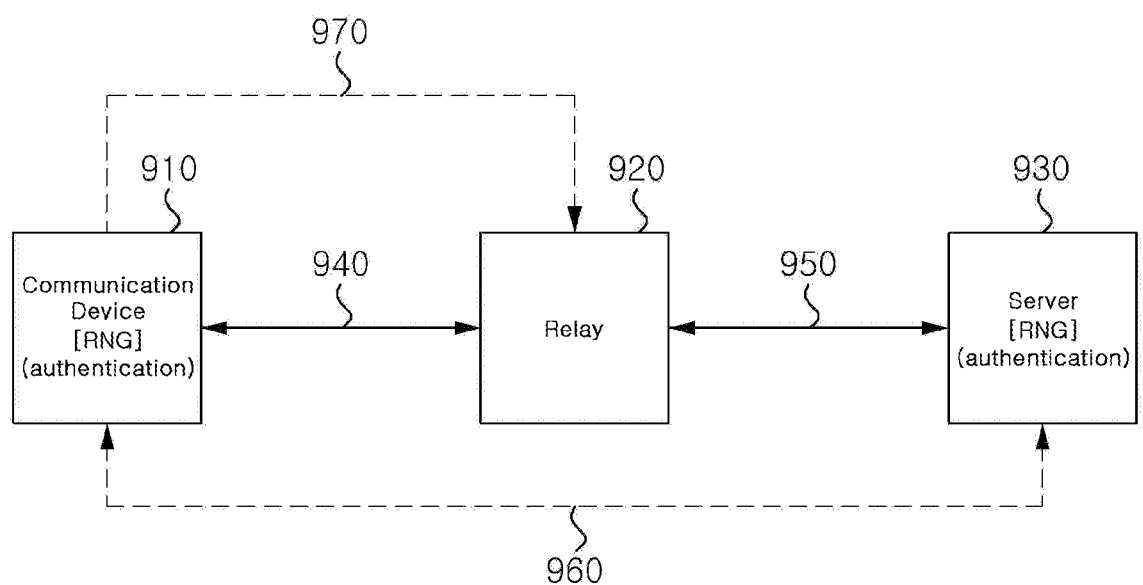
FIG. 9 is a diagram showing a quantum cryptography-based communication and user authentication network system including a relay according to still another embodiment of the present invention.

FIG. 9 is a diagram showing a quantum cryptography-based communication and user authentication network system including a relay according to still another embodiment of the present invention. The communication and user authentication network system of FIG. 9 corresponds to an embodiment in which a server 930 performs random number generation and user authentication.

The communication and user authentication network system of FIG. 9 includes a communication device 910, a relay 920, and the server 930.

Referring to FIG. 9, an optical communication channel 940 transfers first polarized signals including a quantum cryptogram, generated by the communication device 910, to the relay 920, and transfers first polarized signals including a quantum cryptogram, generated by the relay 920, to the communication device 910.

In this case, the relay 920 transfers the first polarized signals, received from the communication device 910, to the server 930 via an optical communication channel 950 without change, and may transfer the first polarized signals, received from the server 930, to the communication device 910 without change. The relay 920 receives first polarization basis information from the communication device 910 via a wired/wireless communication network 970. The relay 920 receives the first polarized signals from the communication device 910 by using the first polarization basis information, maintains the quantum cryptogram information of the first polarized signals, sends the quantum cryptogram information of the first polarized signals by using the first polarization basis information, and transfers the quantum cryptogram information of the first polarized signals to the server 930 via the optical communication channel 950.

Thereafter, the first polarization basis information generated by the communication device 910 and the second polarization basis information generated by the server 930 are shared via a wired/wireless communication network 960.

Accordingly, the server 930 may generate a secret key between the communication device 910 and the server 930 based on the first polarization basis information and the second polarization basis information, may share the secret key with the communication device 910, and may process user authentication.

Although the respective separate embodiments have been shown in FIGS. 6 to 9 for ease of description, the spirit of the present invention is not limited thereto. For example, in order to increase security, there may be implemented a modified embodiment in which the embodiment of FIG. 6 is applied to the first part of all the quantum cryptograms generated by the communication devices 310, 400, 610, 710, 810, and 910 and the embodiment of FIG. 8 is applied to the second part thereof, or there may be implemented a modified embodiment in which the embodiment of FIG. 7 is applied to the first part and the embodiment of FIG. 9 is applied to the second part.

Figure 10:
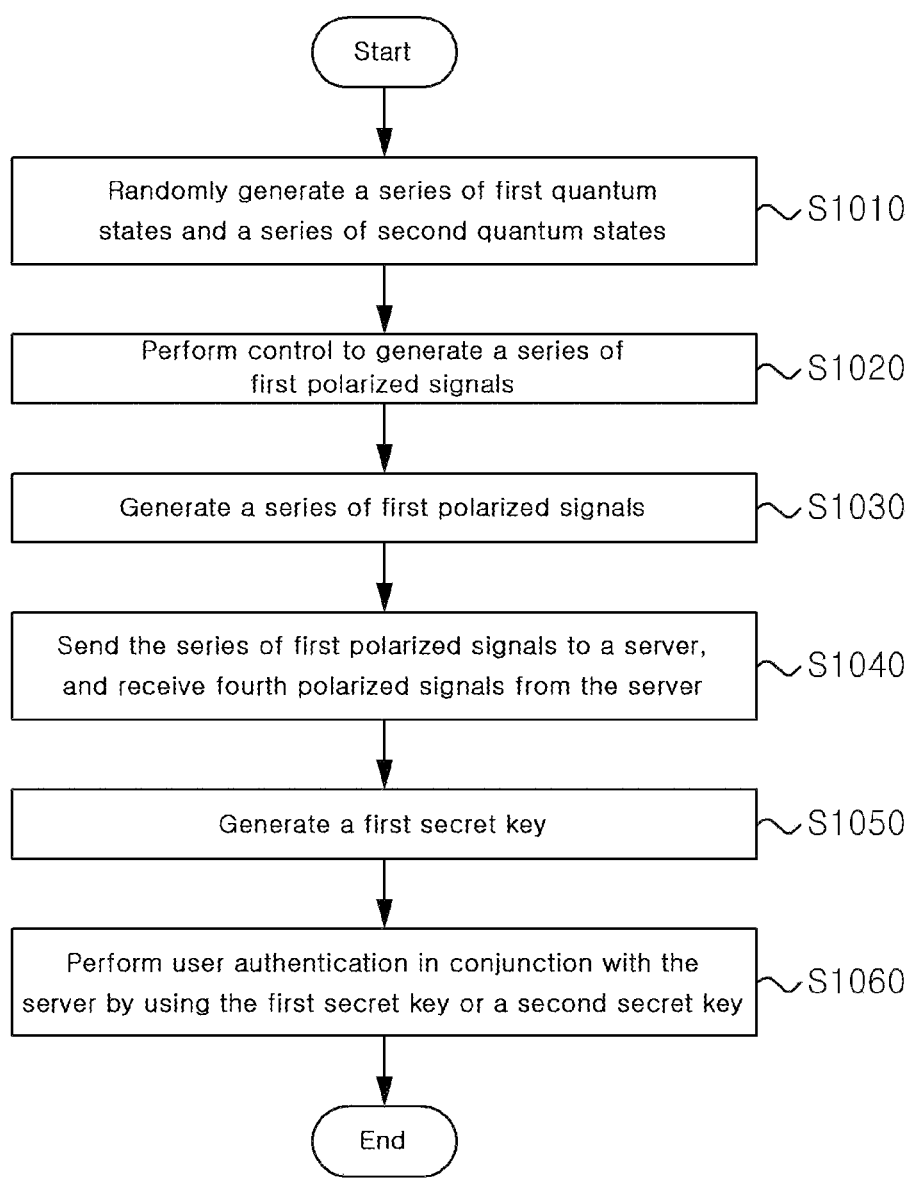
FIG. 10 is a flowchart showing a quantum cryptography authentication method for a communication device according to an embodiment of the present invention.

FIG. 10 is a flowchart showing a quantum cryptography authentication method for a communication device according to an embodiment of the present invention.

The quantum cryptography authentication method for a communication device includes step S1010 of randomly generating, by the random number generation unit 431, a series of first quantum states and a series of second quantum states based on random numbers, and step S1020 of selecting, by the processor 430, a first polarization basis based on the series of randomly generated first quantum states, generating, by the processor 430, a secret key from the series of second quantum states, and controlling, by the processor 430, the polarization generation unit 410 to generate the secret key as the series of first polarized signals based on the first polarization basis.

Thereafter, the polarization generation unit 410 generates a series of first polarized signals by using a first polarization basis of 0 or 45 degrees at step S1030, and the optical communication unit 420 sends the series of first polarized signals to the server, and receives a series of third polarized signals, generated from the server, through a fourth polarization basis as fourth polarized signals at step S1040.

Thereafter, the processor 430 may control the general wired/wireless communication module of the communication device to send information about the first polarization basis to the server, and may control the general wired/wireless communication module of the communication device to receive information about the second polarization basis from the server.

The processor 430 may generate a first secret key by combining the information about the first polarization basis with the information about the second polarization basis and incorporating a secret key based on the second quantum states into the combination at step S1050. Furthermore, although not shown in FIG. 10, the processor 430 may receive information about a third polarization basis from the server, and may generate a second secret key by combining the information about the third polarization basis with information about a fourth polarization basis and incorporating the values of the quantum bit of fourth polarized signals whose measurement has been successful into the combination.

The processor 430 may perform user authentication in conjunction with the server by using any one or both of the first secret key and the second secret key at step S1060.

Figure 11:
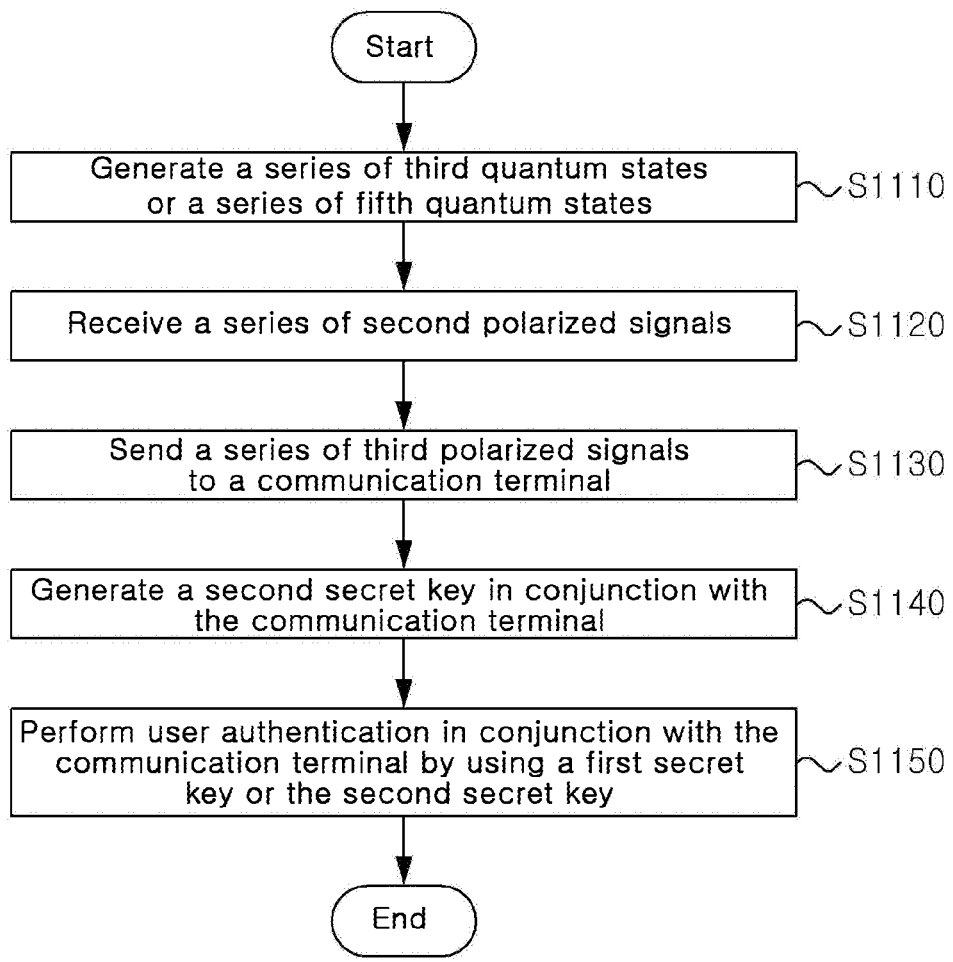
FIG. 11 is a flowchart showing a communication method for a server for quantum cryptography communication according to an embodiment of the present invention.

FIG. 11 is a flowchart showing a communication method for a server for quantum cryptography communication according to an embodiment of the present invention.

The processor 520 of the server 500 may generate a series of third quantum states, a series of fourth quantum states, and a series of fifth quantum states based on random numbers at step S1110.

The processor 520 may set a second polarization basis based on the third quantum states, and the polarization generation unit 530 may generate second polarized signals by passing first polarized signals, sent from the terminal 400, through a second polarization basis. The optical communication unit 510 may receive a series of second polarized signals at step S1120.

Meanwhile, the server 500 may generate a separate quantum cryptogram, and may send the quantum cryptogram to the terminal 400. The optical receiver module of the terminal 400 may obtain quantum state values by measuring a single photon from the polarized signals.

The server 500 may set a third polarization basis based on fourth quantum states, and the polarization generation unit 530 may generate third polarized signals by passing a secret key, generated based on the fifth quantum states, through the third polarization basis. The optical communication unit 510 may send the series of third polarized signals to the communication device 400 at step S1130.

The processor 520 may generate a second secret key between the communication device 400 and the server 500 by combining information about the third polarization basis with information about the fourth polarization basis and using the secret key generated based on the fifth quantum states at step S1140.

The processor 520 may perform user authentication in conjunction with the communication device 400 by selecting any one of the first secret key and the second secret key at step S1150. Furthermore, the processor 520 may perform user authentication in conjunction with the communication device 400 by selecting both of the first secret key and the second secret key.

Figure 12:
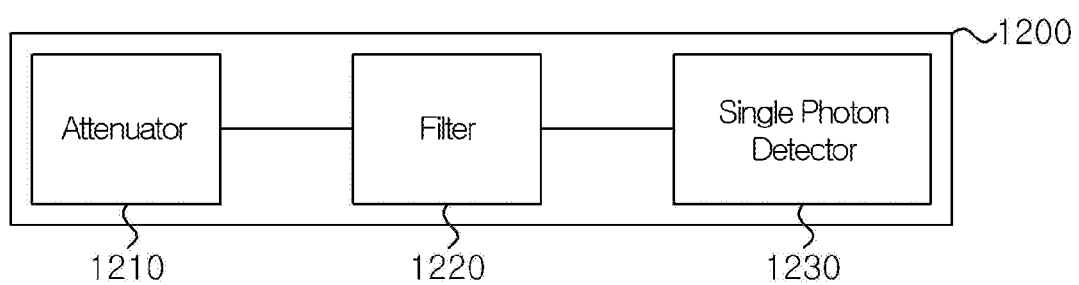
FIG. 12 is a diagram showing the optical communication unit of a quantum cryptography communication device and a communication server according to an embodiment of the present invention.

FIG. 12 is a diagram showing the optical communication unit 1200 of a quantum cryptography communication device and a communication server according to an embodiment of the present invention.

The optical communication unit 1200 includes an attenuator 1210, a filter 1220, and a detector 1230.

The attenuator 1210 is a device configured to attenuate light (the amount or amplitude of light) propagating across an optical fiber or space by a predetermined level. The attenuator 1210 is required to provide appropriate input to a light receiver device or an optical device, and is also used to evaluate the loss of an optical device.

Generally, methods of attenuating light include a method of attenuating light by absorbing part of the light, a method of attenuating light by reflecting part of the light, and a method of attenuating light by spatially blocking part of the light. Currently, the method of attenuating light by reflecting part of the light is chiefly being used. Accordingly, the attenuator 1210 functions to adjust first polarized signals, received via a free-space optical communication channel, to a set predetermined level.

The filter 1220 functions to filter the first polarized signals, adjusted to the predetermined level by the attenuator 1210, in a single photon form, and the detector 1230 measures the first quantum states of the filtered first polarized signals.

When the optical receiver unit is used, polarized signals are attenuated, polarization-filtered, and received and measured through single photon control.

To implement the attenuator, filter, and detector of FIG. 12, expensive hardware is required. Accordingly, it is difficult to install hardware for conventional quantum cryptography reception in a general mobile device or personal terminal. According to the embodiments of the present invention, a mobile device or personal terminal equipped with relatively inexpensive hardware having low-level specifications may be encouraged to be used for quantum cryptography authentication.

In the quantum cryptography authentication process according to an embodiment of the present invention, the communication device, the server or the relay can send and receive quantum signals including a quantum cryptogram by using a proximity free-space optical communication. In this case, when the communication device is located close to the server or relay within a reference distance, for example, 10 cm, probability that a third party eavesdrops on a quantum cryptogram is significantly decreased. Accordingly, a predetermined purpose can be achieved using even a relatively simple quantum cryptography technique. Furthermore, when a user uses a common mobile communication device, a general wireless communication technique or a short distance communication technique accessible to the mobile communication device can be used and then a minimum amount of information required for the sharing of a secret key can be sent and received.

The server or relay can adjust the signal strength of quantum signals to be sent, thereby controlling a mobile device side equipped with hardware having relatively low-level specifications to have sufficient signal strength to receive the quantum signals. The server or relay may adaptively adjust the signal strength of quantum signals based on the distance between the mobile device and the server or relay, or may adaptively adjust the signal strength of quantum signals based on the specifications or characteristics of the quantum signal receiver hardware of the mobile device.

Furthermore, the server or relay can perform a quantum cryptography authentication process by using different quantum cryptogram sets a plurality of times, thereby enabling optimum signal strength to be searched for upon sending of quantum signals.

In the communication device/mobile device according to the present invention, relatively inexpensive hardware can be used to satisfy the desired function of receiving quantum signals in place of expensive hardware, and thus the present invention has the advantage of considerably reducing the cost compared to the conventional quantum cryptography technique.

The communication device described herein may be a mobile communication device including a smartphone, a PDA, and a portable phone. The communication device may generate and send a quantum cryptogram by using a polarized signal generation device formed by combining an RNG and a laser diode, and may measure and interpret a single photon-based quantum cryptogram by using an attenuator and a polarization filter.

The quantum cryptography authentication method that can performed by a communication device, a server or a relay according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, the authentication protocol using quantum cryptography between the mobile device and the server can be implemented by improving part of an authentication process via quantum cryptography in order to be formed to be small and lightweight and to be implemented at low cost. Accordingly, in mobile commerce, user authentication can be performed while high security is being maintained.

Furthermore, the present invention has the advantage of implementing the communication device capable of authentication using quantum cryptography, which can be formed to be small and lightweight and implemented at low cost, and also has the advantage of performing user authentication for mobile commerce via the communication device.

According to the present invention, the advantage of improving the security of a mobile payment application can be achieved by using user authentication via the quantum cryptography authentication method between the communication device and the relay or server.

According to the present invention, modules capable of the transmission or reception of a quantum cryptogram are implemented in a mobile device at minimum cost, and the signal strength of a quantum signal is adjusted to be optimal for information about the quantum cryptography environment of a mobile device in the server or relay, thereby implementing quantum cryptography-based mobile commerce. In other words, in a mobile device, an attenuator and a detector can be implemented at lower cost than an expensive attenuator and detector, thereby enabling quantum cryptography authentication technology to be applied to a mobile commerce environment.

While the present invention has been described in conjunction with specific details, such as specific components, and limited embodiments and diagrams above, these are provided merely to help an overall understanding of the present invention. The present invention is not limited to these embodiments, and various modifications and alterations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A server for quantum cryptography communication, the server comprising:
    an optical receiver configured to generate a series of first quantum signals by receiving a series of second quantum signals using a first quantum filter, the series of second quantum signals generated such that a series of third quantum signals are received and transmitted using a second quantum filter at a relay device, the series of third quantum signals generated by being transmitted using a third quantum filter at a mobile communication device, wherein:
    the series of second quantum signals pass through a first quantum channel between the relay device and the server;
    the series of third quantum signals pass through between the mobile communication device and the relay device; and
    the series of second quantum signals are generated such that at least a part of the series of third quantum signals pass through the second quantum filter at the relay device and are transferred to the server via the first quantum channel, and reach the server;
    a random number generator (RNG) configured to randomly generate a quantum characteristics of the optical receiver to form the first quantum filter in the first quantum channel; and
    a processor configured to:
    select a setting of the first quantum filter based on a series of randomly generated first quantum states by the random number generator;
    share information of the first quantum filter with the mobile communication device and the relay device via a non-quantum channel, receive information of the second quantum filter from the relay device via the non-quantum channel, and receive information of the third quantum filter from the mobile communication device or the relay device via the non-quantum channel;
    generate a first secret key by applying the information of the first quantum filter, the second quantum filter, and the third quantum filter to the series of first quantum signals, wherein the first secret key is the same as a second secret key generated by relay device applying the information of the first quantum filter, the second quantum filter, and the third quantum filter to the series of second quantum signals, and wherein the first secret key is the same as a third secret key generated by the mobile communication device applying the information of the first quantum filter, the second quantum filter, and the third quantum filter to the series of third quantum signals; and
    perform user authentication in conjunction with the mobile communication device and the relay device by using the first secret key.

2. The server of claim 1, wherein the second quantum signals have signal strength adjusted based on a distance between the server and the relay device.

3. The server of claim 1, wherein the random number generator (RNG) includes a quantum random number generator (QRNG).

4. A server for quantum cryptography communication, the server comprising:
    an optical receiver configured to receive a series of first quantum signals using a first quantum filter, the series of first quantum signals generated such that a series of second quantum signals are received and transmitted using the first quantum filter at a relay device, the series of second quantum signals generated by being transmitted using a second quantum filter at a mobile communication device, wherein:
    the series of first quantum signals pass through a first quantum channel between the relay device and the server;
    the series of second quantum signals pass through between the mobile communication device and the relay device; and
    the series of first quantum signals are generated such that at least a part of the series of second quantum signals pass through the first quantum filter at the relay device and are transferred to the server via the first quantum channel, and reach the server;
    a random number generator (RNG) configured to randomly generate a quantum characteristics of the optical receiver to form the first quantum filter in the first quantum channel; and
    a processor configured to:
    select a setting of the first quantum filter based on a series of randomly generated first quantum states by the random number generator;
    share information of the first quantum filter with the mobile communication device and the relay device via a non-quantum channel; and
    accept user authentication result performed by the relay device in conjunction with the mobile communication device by using a first secret key generated by the relay device applying the information of the first quantum filter and the second quantum filter to the series of first quantum signals, wherein the first secret key is the same as a second secret key generated by the mobile communication device applying the information of the first quantum filter and the second quantum filter to the series of second quantum signals.

5. A quantum cryptography authentication method for a server, the method comprising:
   randomly generating a series of first quantum states based on random numbers;
   selecting a first quantum filter based on the first quantum states;
   generating a series of first quantum signals by receiving a series of second quantum signals using the first quantum filter, the series of second quantum signals generated such that a series of third quantum signals are received and transmitted using a second quantum filter at a relay device, the series of third quantum signals generated by being transmitted using a third quantum filter at a mobile communication device, wherein:
   the series of second quantum signals pass through a first quantum channel between the relay device and the server;
   the series of third quantum signals pass through between the mobile communication device and the relay device; and
   the series of second quantum signals being generated such that at least a part of the series of third quantum signals pass through the second quantum filter at the relay device and are transferred to the server via the first quantum channel, and reach the server;
   sharing information of the first quantum filter with the mobile communication device and the relay device via a non-quantum channel, receive information of the second quantum filter from the relay device via the non-quantum channel, and receive information of the third quantum filter from the mobile communication device or the relay device via the non-quantum channel;
   generating a first secret key by applying the information of the first quantum filter, the second quantum filter, and the third quantum filter to the series of first quantum signals, wherein the first secret key is the same as a second secret key generated by relay device applying the information of the first quantum filter, the second quantum filter, and the third quantum filter to the series of second quantum signals, and wherein the first secret key is the same as a third secret key generated by the mobile communication device applying the information of the first quantum filter, the second quantum filter, and the third quantum filter to the series of third quantum signals; and
   performing user authentication in conjunction with the mobile communication device and the relay device by using the first secret key.

6. The quantum cryptography authentication method of claim 5, wherein the second quantum signals have signal strength adjusted based on a distance between the server and the relay device.

* * * * *